May 23, 1933.  N. B. LA FAZAN ET AL  1,910,614
COFFEE URN
Filed June 18, 1931  2 Sheets-Sheet 1
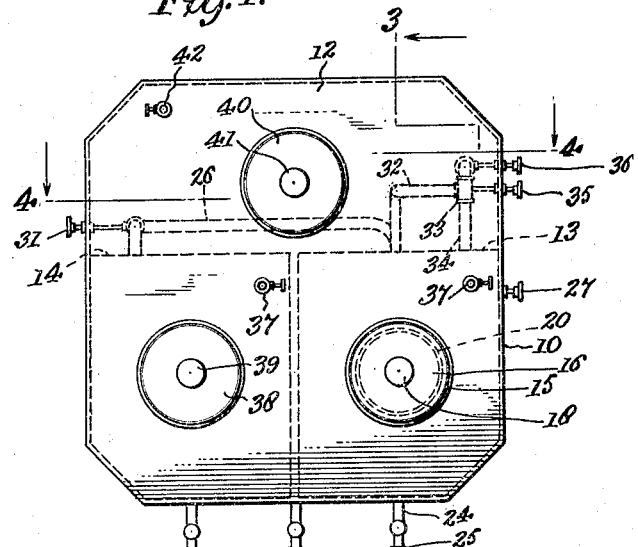
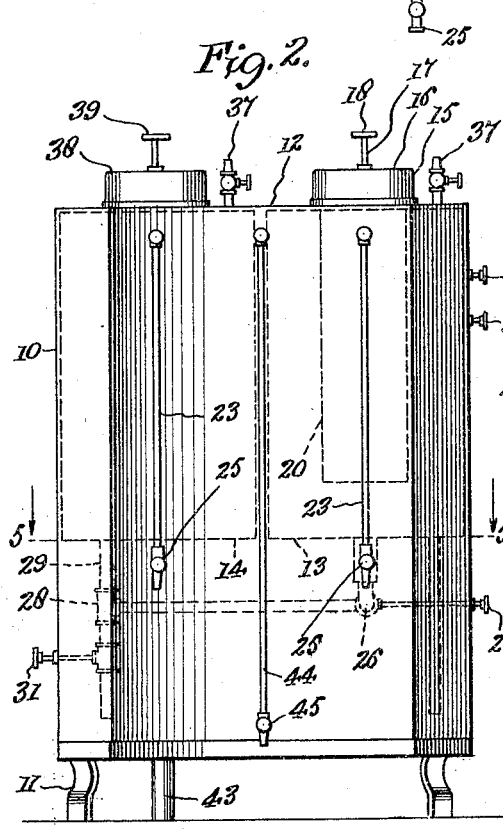
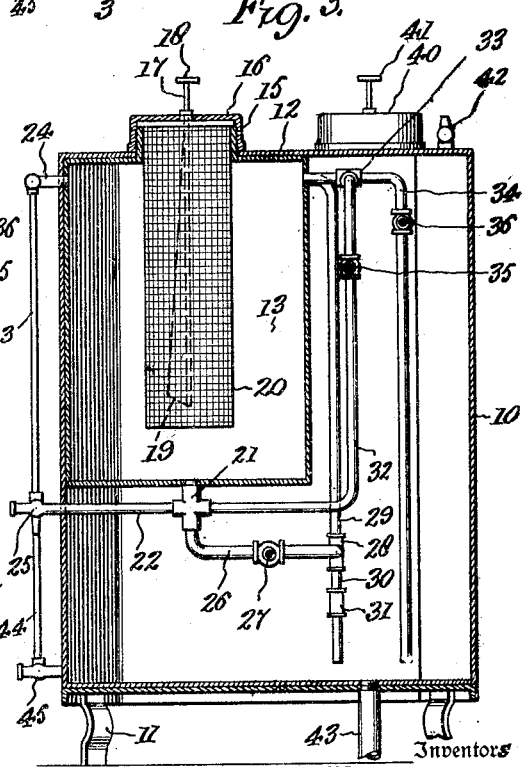
Inventors
*Nick B. La Fazan*
*Peter P. Tetnowski*
By and *Walter F. Tentnowski*
Mawhinney & Mawhinney
Attorneys.

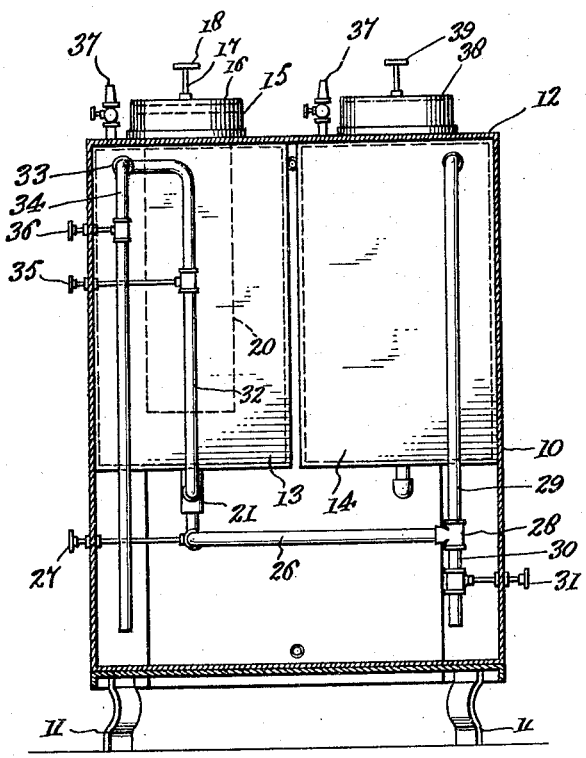
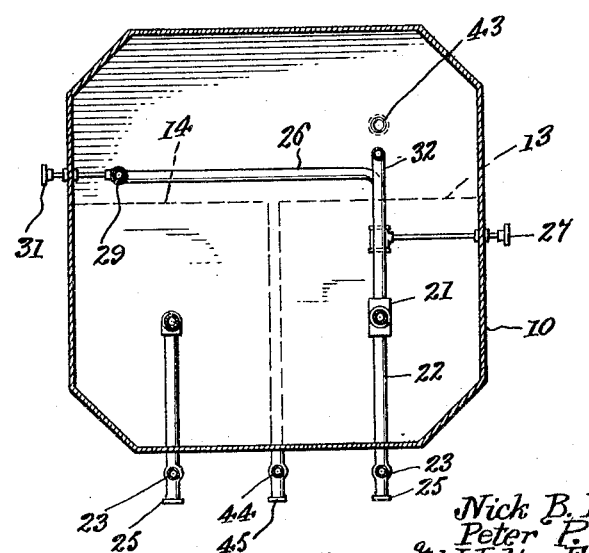

Patented May 23, 1933

1,910,614

UNITED STATES PATENT OFFICE

NICK B. LA FAZAN, PETER P. TETNOWSKI, AND WALTER F. TENTNOWSKI, OF DETROIT, MICHIGAN

COFFEE URN

Application filed June 18, 1931. Serial No. 545,308.

The present invention relates to coffee urns, and more particularly to that type adapted to be used in restaurants, hotels and any other place where relatively large quantities of coffee are dispensed.

An object of this invention is to provide a coffee urn which by its construction maintains a steam tight fit between the parts to prevent escape of steam and the aroma and essence of the coffee; which may be provided with agitating means for the ground coffee in the foraminous container; which may be provided with a novel coffee and water circulating means for returning the percolated coffee from the bottom of the chamber to the upper end thereof to complete a circuitous passage and thoroughly percolate the contents of the chamber; and which is provided with a novel means for supplying hot water from the main casing or container to the percolating chamber.

Another object of the present invention is to provide a coffee urn with a storage chamber or compartment which is disposed in the casing independently of the percolating compartment but which is in controlled communication therewith so that quantities of coffee made in the percolating compartment may be transferred and stored in the second compartment without exposure to the atmosphere and independently of the percolating chamber or compartment so that the latter may be prepared from time to time for fresh quantities of coffee.

A further object of the invention is to provide novel means, in combination with the transfer means for the coffee from the percolating chambers to the storage chamber, for admitting desired amounts of water from the body or casing of the urn into the storage chamber to flush and clean the same.

A still further object of the invention is to provide a construction of urn with various compartments therein which may be of any desired number and suitably interconnected in accordance with the features of this invention so as to accommodate a desired number of storage chambers and percolating chambers and thus take care of large or small quantities of coffee. The invention also aims at the provision of a construction wherein the coffee may be continuously made and transferred to the storage compartment or compartments so as not to interrupt the percolating action in the one or more percolating compartments used.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a top plan view of a coffee urn constructed according to the present invention.

Figure 2 is a front elevation of the same.

Figure 3 is a vertical longitudinal section taken through the coffee urn on the line 3—3 of Fig. 1 and through the percolating compartment.

Figure 4 is a transverse vertical section taken on the line 4—4 of Fig. 1 and looking in the direction indicated by the arrows, and Figure 5 is a horizontal transverse section taken through the urn substantially on the line 5—5 of Fig. 2.

Referring now to the drawings, 10 designates a casing or body portion made of any suitable configuration, size and material, and may be given any desired ornamental effect. The casing 10 may be supported upon legs 11 and is provided with a top wall 12 adapted to house the various chambers or compartments and piping employed.

Arranged in any suitable manner within the casing, and preferably at the forward portion thereof, is a pair of chambers, compartments or containers 13 and 14. The chamber 13 comprises a percolating chamber and may be in the form of a separate receptacle fitted within the upper forward part of the casing 10 and conforming in configuration to the adjacent outer walls thereof. This container 13 is provided with an exteriorly threaded neck portion 15 which rises through a registering opening in the top 12 of the casing 10 adapted to receive thereon a detachable threaded cap 16 which bears at its lower edge against the top of the casing to support the container in the casing and seal the latter to the atmosphere. The cap 16 may be provided centrally with a stirrer shaft 17 having a handle 18 on its upper end, and which projects downwardly through the cap 16 for a considerable distance into the container 13, and which is provided with a paddle or stirrer 19 adapted to operate in a foraminous or perforated receptacle 20 for ground coffee.

The bottom of the container 13 is connected to a four-way coupling 21 having a branch pipe 22 which extends outwardly through the front of the casing 10 and is connected to a gage glass 23. The upper end of the gage glass 23 is supported by a stem or bracket 24 at its upper end against the casing 10. The outer end of the branch pipe 22 where it connects with the gage glass 23 is provided with a suitable faucet or take-off valve 25 which is conveniently located at the front of the casing for drawing off coffee directly from the percolator when desired.

To the four-way coupling 21 is connected a branch pipe 26 in which is placed a hand valve 27. This branch pipe 26 extends across the under side of the percolator 13 and thence laterally within the casing 10 to the rear portion of the opposite chamber or container 14 in which the made coffee is to be stored. The branch pipe 26 is connected by a coupling 28 to a riser pipe 29 which opens into the rear wall of the storage chamber 14 near the top of the latter. The coupling 28 is preferably of the T type and its lower branch is connected to a short length of pipe 30 provided with a control valve 31 which opens to the interior of the body or casing 10 near its lower end.

The fourth branch of the coupling 21 is connected to a return pipe 32 which is carried rearwardly from beneath the percolating chamber 13 and upwardly at the rear side thereof and opens through a T coupling 33 into a water supply pipe 34 which extends from the coupling 33 through the rear wall of the percolating chamber 13. Thus, the pipe 32 is in circuit with the upper and lower end of the percolating chamber, and the pipe 32 is provided with a hand valve 35 for controlling the passage of the water and coffee therethrough.

The water supply pipe 34 extends downwardly in the body or casing 10 and opens thereinto near the bottom of the casing. The pipe 34 has a hand valve 36 therein for regulating the upward flow of water from the casing into the compartment. Each of the compartments 13 and 14 is provided with a valve controlled vent 37 preferably located in the top of the casing 10 and opening therethrough into the respective compartments or chambers. The storage compartment 14 is provided with a removable cap 38 similar to the cap 15 having a suitable handle 39 by means of which the cover may be positioned and removed. The casing 10 is also provided in offset relation with respect to the compartments or chambers 13 and 14, with a removable cover 40 having a handle 41 by means of which the cover may be removed for cleansing and other purposes. The casing or body portion 10 is also provided in its top 12 with a safety valve 42 to prevent excess pressure of steam in the apparatus. Water is supplied in desired quantities to the casing or body 10 through a supply pipe 43 which leads from any suitable or convenient source of water supply. The storage chamber 14 is, like the chamber 13, provided with a gage glass 23 and a draw-off faucet 25.

It is preferable to provide the body portion of the casing 10 with a water level glass 44 disposed at the front of the casing and between the compartments 13 and 14, and which is provided with a draw-off valve 45 by means of which the contents of the casing 10 may be withdrawn.

In use, water to the desired quantity is placed in the body portion or casing 10. Heat is now applied to the bottom of the casing 10 so as to heat the water and contents of the casing. After the water reaches the proper temperature the ground coffee is placed in the receptacle 20 and the valve 36 is opened and also the vent 37 from the percolating chamber 13. The water now rises through the pipe 34 into the percolating chamber 13, the hot water passing into the chamber 13 passes down through the chamber 13 and about and through the receptacle 20 and the ground coffee in the usual manner and the contents of the container 20 may be stirred from time to time by the paddle 19 which is operated from the handle 18 above the percolating compartment. The coffee thus formed is collected in the bottom of the chamber 13 and after the desired amount of coffee has been so formed the valve 36 may be closed off to the desired extent and the valve 35 may be opened so as to create a circulation of the coffee from the bottom of the compartment 13 through the pipe 32 and back into the top of the compartment 13. The pipe 32 thus saves the manual labor, danger and the necessary time required for transferring the coffee from the bottom of the percolating chamber to the top thereof in the old well known manner of using a pitcher, or the like. Another essential feature of the pipe 32 in this connection is that during the transfer of the coffee from the bottom to the top of the percolating chamber no steam, aroma or essence is permitted to escape from the chamber, thus conserving the coffee.

After the desired amount of coffee has been made and of the desired strength, the body of coffee so formed may be transferred readily to the storage chamber 14 so that a fresh supply of coffee may be immediately produced. To effect this, the valves 35 and 36 are closed and the valve having the handle 27 is opened. The vent 37 of the percolating compartment 13 is also closed so that the pressure accumulating in the percolating chamber forces the coffee from the bottom thereof through the pipe 26, coupling 28, into the riser pipe 29 and thus over into the storage compartment or chamber 14. During this time it is necessary that the vent 37 of the storage compartment 14 be open. The percolating chamber 13 may now be immediately used for making a fresh quantity of coffee and the faucet 25 of the storage compartment 13 may be used for drawing off small quantities of coffee, such as cups of coffee, from time to time without disturbing the operation of the percolator.

It is of course understood that any desired number of storage compartments 14, or even of percolating compartments 13 may be provided within the size of the casing to meet various requirements in use and at the same time the features of the present invention may be utilized.

When it is desired to flush out or clean the storage compartment 14, such may be effected by means of the hot water in the casing 10 by closing the valve 27 and opening the valve 31 so that the hot water may rise through the pipe 29 into the storage chamber 14. Of course the cap 38 may be removed from the storage chamber before or during this operation and access may be easily had to all parts of the urn through the various openings provided. It will also be noted that the various valves employed have handles or stems which are of sufficient length to extend through the adjacent side walls of the casing 10 so that easy access may be had to the different control valves. It may also be observed that the pipe 24 may be used for admitting water from the interior of the casing 10 into the percolating chamber 13 when it is desired to flush and clean out the same.

It is apparent from the above construction that this invention provides a coffee urn which is of compact structure and which at the same time provides the necessary separate percolating and coffee and water storage chambers, which occupies but relatively small space and which may be operated from a single burner over which the urn is placed.

It is also apparent that by the simplified construction which is afforded by this invention the same may be manufactured at a relatively low cost and may be thus produced and marketed at an economical figure.

The structure of the urn of this invention overcomes the disadvantages of superposed chambers or compartments which have heretofore been used and to which access cannot easily be had. The present invention provides all the necessary compartments and at the same time admits of quick and easy access to the compartments and also admits of the independent cleaning operation in one compartment while the other compartment or compartments may be used for making or storage of the coffee.

It is obvious that various changes and modifications may be made in the details of construction and design of the above specifically described embodiment of this invention without departing from the spirit thereof, such changes and modifications being restricted only by the scope of the following claims:

What is claimed is:

1. A coffee urn comprising an enclosing casing for containing hot water, a pair of independent receptacles mounted within the casing and opening independently through the top thereof, a foraminous receptacle suspended in one of said containers for percolating coffee therein, a circulating pipe leading from the bottom of said percolating container and opening into the upper end thereof and disposed in the casing for heating this pipe to promote circulation of the water and coffee in said container and pipe, a valve in said pipe for controlling the circulation of the water and coffee being percolated, a valve controlled connection between the containers for transferring coffee when made to the second container for storage therein, and a valved vent independently opening into the upper end of each of said containers.

2. A coffee urn, comprising a casing adapted to receive water to be heated, a pair of containers mounted in the casing, a foraminous receptacle suspended in one of the containers, a water pipe leading from the upper end of each container and opening in the casing near the bottom thereof, a control valve in each of said pipes to control flow of water independently to the containers from the casing, a cross pipe connected at one end to the upper end of the water pipe of the container having the foraminous receptacle therein and connected at its other end to the lower portion of the opposite water pipe above the valve therein, spaced valves in said cross pipe, near the opposite ends thereof, and a connection between the intermediate portions of the cross pipe and the bottom of said container having the foraminous receptacle.

3. A coffee urn, comprising a casing, a container in the casing, a foraminous receptacle suspended in the container, a water pipe connected at its upper end to the upper portion of the container and opening at its lower end into the casing near the bottom thereof, a valve in said water pipe to control flow of water into the upper end of the container, a second container, a second water pipe for the second container leading from the upper portion thereof to a point near the bottom of the casing, a valve in said second water pipe, a third pipe leading from the bottom of said first container to the upper portion of said first water pipe above the valve therein, a control valve in said third pipe leading from the bottom of the first container, a branch pipe leading from the bottom of the first container to said second water pipe and connected thereto above the valve therein, a valve in said branch pipe, and a draw-off pipe leading from the bottom of said first container through the outer wall of the casing.

In testimony whereof we affix our signatures.

NICK B. LA FAZAN.
PETER P. TETNOWSKI.
WALTER F. TENTNOWSKI.